United States Patent [19] [11] 4,411,665
Egli et al. [45] * Oct. 25, 1983

[54] DYEING PROCESS USING ALKOXYLATED FATTY AMINES AND POLYAMINES AS RESERVING AGENTS

[75] Inventors: Hermann Egli, Basel; Emil Engeler, Binningen, both of Switzerland

[73] Assignee: Sandoz Ltd., Basel, Switzerland

[*] Notice: The portion of the term of this patent subsequent to Aug. 25, 1998, has been disclaimed.

[21] Appl. No.: 277,860

[22] Filed: Jun. 26, 1981

Related U.S. Application Data

[63] Continuation-in-part of Ser. No. 117,254, Jan. 31, 1980, Pat. No. 4,285,691.

[30] Foreign Application Priority Data

Feb. 6, 1979 [CH] Switzerland ............... 1149/79

[51] Int. Cl.³ .................. D06P 5/12; D06P 5/00; D06P 5/13; D06P 3/87
[52] U.S. Cl. ................................ 8/455; 8/457; 8/463; 8/478
[58] Field of Search ............. 8/463, 457, 455, 478

[56] References Cited

U.S. PATENT DOCUMENTS 2,963,513 12/1960 Albrecht ........................ 8/604
2,967,755 1/1961 Keller ........................... 8/602
3,074,774 1/1963 Sapers et al. ................... 8/457
3,591,325 7/1971 Sapers .......................... 8/457
3,627,475 12/1971 Baumann ........................ 8/558

FOREIGN PATENT DOCUMENTS 1006787 10/1965 United Kingdom .
1489456 10/1977 United Kingdom .

OTHER PUBLICATIONS

Atherton, E., Jour. of the Soc. of Dyers and Colorists, vol. 74, No. 4, p. 242, (1958).

Primary Examiner—Maria Parrish Tungol
Attorney, Agent, or Firm—Gerald D. Sharkin; Richard E. Vila; Thomas C. Doyle

[57] ABSTRACT

The invention relates to a wet-on-wet dyeing process comprising
(A) impregnating the substrate with an acid dyeing liquor containing an anionic dye having a $K'_{pH6}$-value $\geq 5$
(B) applying locally to the substrate at room temperature, a liquor or paste containing an alkoxylated fatty amine or polyamine having affinity for anionic dyes with a $K'_{pH6}$-value $\geq 5$, said step (B) being carried out directly after or directly before said step (A), and
(C) subsequently submitting the substrate to a heat treatment to effect fixation of the dye.

30 Claims, No Drawings

DYEING PROCESS USING ALKOXYLATED FATTY AMINES AND POLYAMINES AS RESERVING AGENTS

The present application is a continuation-in-part application of application Ser. No. 117,254 filed on Jan. 31, 1980 and now U.S. Pat. No. 4,285,691.

The present invention relates to a process for dyeing a substrate dyeable with anionic dyes to produce reserve or multicoloured effects.

It is known to obtain reserve, tone-in-tone or multicoloured effects either by applying to a substrate in a two-stage process a reserving agent containing a fibre-reactive group followed by fixation and subsequently dyeing the substrate with anionic, cationic or disperse dyes, or by a wet-on-wet process in the absence or in the presence of a reserving agent, such agent having affinity for fibres. The former process requires an intermediary fixation step whereas in the latter a substantial amount of reserving agent is necessary to obtain full or almost full reservation and the reservation and multicoloured effects thereby obtained are unsatisfactory. Furthermore, the choice of dyestuffs employable to obtain total or almost total reserve effects is limited.

It has now been found that total reserve effects and bi- or multi-coloured effects of pure shade may be achieved in a wet-on-wet dyeing process by the use of an alkoxylated fatty amine or polyamine as reserving agent.

Accordingly, the present invention provides a process for dyeing an anionic dyeable substrate with reserve effects, which process comprises (A) impregnating the substrate with an acid dyeing liquor containing an anionic dye having a $K'_{pH6}$-value $\geq 5$ (B) applying locally to the substrate at room temperature, a liquor or paste containing an alkoxylated fatty amine or polyamine having affinity for anionic dyes with a $K'_{pH6}$-value $\geq 5$, said step (B) being carried out directly after or directly before said step (A), and (C) subsequently submitting the substrate to a heat treatment to effect fixation of the dye.

Regardless of which step (A) or (B) is carried out first, the liquors or paste of both steps (A) and (B) are applied at least to one common area of the substrate.

According to a further aspect of the invention, the liquor or paste of step (B) may contain, in addition to the alkoxylated fatty amine or polyamine, a disperse or anionic dye or a mixture thereof or an anionic optical brightening agent, provided that the anionic dye or anionic optical brightening agent has a $K'_{pH6}$-value $\leq 5$ which is at least one unit lower than the $K'_{pH6}$-value of the anionic dye used in step (A). As it will be appreciated, the dyes or optical brightening agent applied in step (B) are also fixed by the heat treatment of step (C).

The $K'_{pH6}$-value represents the combinability value of an anionic dye experimentally assessed at pH 6 in the presence of a cationic compound; this value is usually employed to indicate the combination capacity of anionic dyes [See G.B. Pat. No. 1,489,456;Otten H. G., Bayer Farbenrevue, 21, 32 (1972); and Beckmann W., Hoffmann F. and Otten H. G., Melliand Textilber. 6, 641 (1973)]. The K'-value is a specific dyestuff characteristic which provides a practical indication of the behaviour in dyeing of an anionic dye in relation with its combination capacity. This value usually may vary from 1 to 10.

The $K'_{pH6}$-value of the anionic dyes may be assessed according to the following test method with reference to a standard anionic dye whose $K'_{pH6}$-value is known:

Nylon yarn (Du Pont, type 846) is introduced at a goods to liquor ratio of 1:40 in a dyebath at 40° and pH 6. This dyebath contains demineralized water, a standard anionic dye and the dye to be tested in an amount corresponding for each dye respectively to the amount sufficient to obtain a standard dyeing of 1/3 S.I. (Standard Intensity), 2 g/l sodium dihydrogen phosphate, 0.3 g/l disodium hydrogen phosphate, and 2% by weight of the substrate of tallow fatty amino-propylene-amine ethoxylated with an average of 100–120 mols of ethylene oxide.

The dyebath is then heated from 40° to 100° C. at a rate of 1° C./min. The dye concentration in the dyebath is determined spectrophotometrically every 5 min (or 2.5 min when the dye builds up quickly) and calculated with a computer. The $K'_{pH6}$-value of the dye to be tested is then calculated according to the method indicated by Atherton E., Downey D. A. and Peters R. H. in J.S.D.C., 74, 242 (1958).

Step (A) is a ground dyeing or printing of the substrate, preferably on the whole area. The expression "ground dyeing or printing" refers only to the application of the dye onto the substrate but does not include the fixation of the dye. Step (A) may be carried out at room temperature according to known methods, e.g. padding, pouring, slop-padding, printing, etc. Suitable anionic dyes for the ground dyeing or printing are those having a $K'_{pH6}$-value $\geq 5$, preferably $\geq 6$. Preferred anionic dyes are acid dyes containing two or more sulpho groups and metal complex dyes containing at least one sulpho group. More preferred anionic dyes are 1:2 or 1:1 chromium or cobalt complexes, particularly of azo or azomethine dye, containing one or two sulpho groups. Such dyes are known from the Colour Index. Particularly preferred anionic dyes are e.g. C.I. Acid Yellow 235, 218, Acid Orange 168, Acid Red 399, 263, 128, Acid Violet 128, Acid Blue 296, 247, 80, Acid Green 106, Acid Brown 289, 298, 363, Acid Black 218.

In addition to the anionic dye, the dyeing liquor used in step (A) may contain conventional additives such as a thickening agent, a dispersing agent, a buffer, etc. The dyeing liquor is adjusted to an acid pH, preferably 4 to 7, more preferably 5 to 6.5. Suitable buffer systems are e.g. an acetic acid/sodium acetate mixture, monosodium phosphate or a mixture of mono- and disodium phosphate. The pick-up of the dyeing liquor in step (A) is generally in the range of from 60 to 400%, preferably 80 to 200%, based on the weight of the dry substrate.

In step (B), the substrate is locally treated, in controlled form or at random, with a liquor or a paste containing an alkoxylated fatty amine or polyamine having affinity for anionic dyes with a $K'_{pH6}$-value $\geq 5$. The affinity of the amine for anionic dyes with a $K'_{pH6} \geq 5$ may be assessed e.g. by the following test method:

Two dye solutions are prepared (a) 0.2 ml of an aqueous solution of a standard anionic dye (1 part dye per 100 parts water), having a $K'_{pH6}$-value $\geq 5$ are added to 5 ml of demineralized water.

(b) A solution is prepared according to (a) and then 0.5 ml of an aqueous solution of the alkoxylated fatty amine or polyamine to be tested (0.4 parts amine per 100 parts water) are added to the solution.

A drop of each solution (a) and (b) is deposited on a thin layer chromatography plate. After drying at room temperature, the spot of the solution (a) is coloured on the whole diffusion surface whereas the spot of the solution (b) containing the amine having affinity for anionic dyes with a $K'_{pH6}$-value $\geq 5$ is coloured in the center and comprises a substantially colourless and relatively wide diffusion edge.

The amines used in step (B) are compounds known as having levelling or stripping properties. In the following discussion, the alkoxylated fatty amines or polyamines are referred to as reserving agents since it has been found that they give reserve effects. These compounds are free from fibre-reactive groups. Preferably the reserving agent has a cationic or amphoteric character, more preferably cationic.

Preferred cationic reserving agents according to the invention are those of formula I

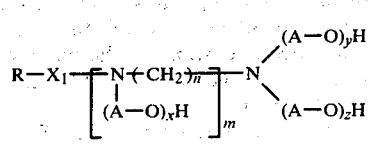

wherein
R is $(C_{10-24})$alkyl or $(C_{10-24})$alkenyl
$X_1$ is —CO— or a direct bond
in each $(A—O)_x$, $(A—O)_y$ and $(A—O)_z$ chain A is, independently, —CH$_2$CH$_2$— or

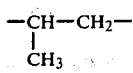

each n is, independently, 2 or 3
m is 0 or an integer from 1 to 6, and
each x, y or z is a numeral from 1 to 100 the sum x+y+z being from 10 to 102,
in the form of a free base, acid addition salt, quaternary ammonium salt or mixture thereof, and mixtures of such compounds differing from one another by virtue of the significance of R.

R is preferably $(C_{12-24})$alkyl or $(C_{12-24})$alkenyl. R may be for example dodecyl, hexadecyl, octadecyl, octadecadienyl, arachinyl, behenyl, the mixture of alkyl groups present in soya fatty acid or tallow fatty acid, etc. . .

n is preferably 2 when m exceeds 1, and preferably 3 when m is 1.

m is preferably 1, 2 or 3, more preferably 1.

Preferably the sum x+y+z corresponding to the total number of ethylene-oxy units, propylene-oxy units or mixture thereof is from 15 to 80, more preferably from 30 to 40. The $(AO)_{x,y,z}$ chains are preferably made up of ethylene-oxy units or ethylene-oxy and propylene-oxy blocks, more preferably of ethylene-oxy units.

The alkoxylated amine or polyamine, particularly the compounds of formula I, may be used in the form of an acid addition salt, quaternary ammonium salt or mixtures thereof. Preferred acid addition salt forms are those derived from hydrogen haloacids, for example from hydrochloric acid. Preferred quaternary ammonium salt forms are those bearing on the quaternized nitrogen atom a $(C_{1-4})$alkyl or aryl-$(C_{1-4})$alkyl group, especially methyl or benzyl. Suitable anions of the quaternary ammonium salts are e.g. halogenide, preferably chloride, or sulfate ions.

A preferred class of reserving agents of formula I is the one constituted by compounds of formula Ia

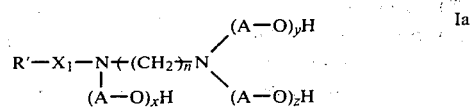

wherein
A, $X_1$, x, y, z and n are as defined above, and
R' is $(C_{12-24})$alkyl or $(C_{12-24})$alkenyl
in the form of a free base, acid addition salt, quaternary ammonium salt or mixture thereof.

Particularly preferred compounds of formula I are amino-propyl-tallow-amine or tallow fatty acid amidopropylamine each ethoxylated with 15 to 80 mols of ethylene oxide, more preferably with 30 to 40 mols of ethylene oxide.

The compounds of formula I are either known or may be prepared in known manner e.g. as disclosed in U.S. Pat. Nos. 3,627,475 and 2,967,755 and in G.B. Pat. No. 1,006,787.

The amount of reserving agent in the paste or liquor used in step (B) may vary within wide limits depending on the desired effect and on the dyes used. In general, satisfactory results are obtained when the liquor or paste contains 1 to 15 g/liter, preferably 1 to 12, more preferably 6 to 10 g/liter of reserving agent.

The paste or liquor applied in step (B) may be alkaline, neutral, or slightly acid provided that the pH of the locally applied liquor or paste is at least one unit higher than the pH of the liquor used in step (A). It is preferably adjusted to an alkaline pH, more preferably to a pH from 7 to 10 depending on the dyestuffs used and the nature of the substrate. Such an adjustment of the pH may be effected by the addition of a basic compound, e.g. trisodium phosphate, disodium phosphate, borax, etc.

The local application of the reserving agent in step (B) may be effected by known methods, for example by printing, e.g. flat or rotary screen printing or jet printing, space-dyeing or dropping e.g. by the TAK process.

When bi- or multi-coloured effects are desired, the reserving paste or liquor locally applied in step (B) may contain, in addition to the reserving agent, also an anionic dye, a disperse dye or a mixture thereof or an anionic optical brightening agent, provided that the anionic dye or anionic optical brightening agent has a $K'_{pH6}$-value $\geq 5$ which is at least one unit lower than the $K'_{pH6}$-value of the anionic dye used in step (A). Depending on the final pattern which is desired, it may be possible to apply one or more of such pastes or liquors, either simultaneously or one after the other. For example, a paste containing the reserving agent alone and one or more liquors or pastes comprising the reserving agent together with a disperse dye or one or more anionic dyes of the specified type may be applied locally either directly before or directly after step (A).

Suitable dyes or optical brightening agents for the local colouration are those whose build-up or fixation behaviour is not adversely affected either by the reserving agent or the application conditions. Suitable anionic dyes are those having preferably a $K'_{pH6}$-value $<5$, more preferably 2 to 6 units lower than the $K'_{pH6}$-value of the anionic dye applied in step (A). Preferred anionic dyes of this type are non metallized acid and direct dyes containing no more than one sulpho group and metal complex dyes free from sulpho groups, more preferably acid dyes, particularly levelling dyes. Such anionic dyes and the disperse dyes which may be used are known from the Colour Index. Anionic dyes are preferred for the local colouration. Examples of preferred anionic dyes include C.I. Acid Yellow 196, 132, 151, Orange 156, 67, Blue 288, 40, 278, Red 299.

When an optical brightener is applied, preferred brighteners are those having "dyeing" and combinability properties analogous to the anionic dyes used in step (B).

In addition to the reserving agent and optionally the dye or brightener, the reserving paste or liquor may contain conventional additives, for example thickeners. Such thickeners must be resistant to alkaline conditions when an alkaline liquor or paste is used in step (B). Suitable thickeners for the alkaline reserving paste or liquor are e.g. alginates and etherified flour thickeners, especially when the alkali trisodium phosphate. Preferably the reserving paste or liquor of step (B) has a higher viscosity than the impregnation liquor of step (A). The latter has preferably a viscosity which enables a good impregnation of the substrate whereas the former is preferably thickened to prevent or control its spreading. The viscosity of the reserving liquor or paste of step (B) depends on the application techniques and the desired pattern; for example, it may be about 200 cps in the TAK process or exceed 2000 cps when the liquor or paste of step (B) is applied by printing.

As it will be appreciated the impregnation liquor or step (A) as well as the reserving paste or liquor of step (B) is free from reducing agents, e.g. hydrosulphites.

Steps (A) and (B) are carried out without any intermediary rinsing or drying step, regardless of which step is carried out first.

Subsequent to the latter of steps (A) and (B), the substrate is submitted to a heat treatment to effect fixation of the dye applied in step (A) and optionally in step (B) or, if used, of the brightening agent. Fixation can be achieved by known methods depending on the dyestuff or agent used, preferably with saturated steam at a temperature from 100° to 105° C. The heat treatment in step (C) is carried out for 2 to 20, preferably 5 to 10 minutes.

After fixation has been achieved, the substrate may be rinsed and dried in conventional manner.

The substrates dyeable with anionic dyes are preferably those consisting of or comprising natural polyamide, e.g. wool or silk, synthetic polyamide, e.g. nylon 6, 66, etc. . . and blends thereof, including differential synthetic polyamide (deep dye, medium affinity, and low affinity fibres). The substrate may for example be in form of yarn, fibres, filaments, woven or knitted goods, felt or carpets. The process of the invention is particularly suitable for dyeing polyamide carpets, preferably synthetic polyamide carpets.

The dyeing process of the invention is a continuous dyeing of a substrate according to a wet-on-wet method. White, tone-in-tone or coloured contrast effects with, if desired, sharp outlines and more particularly with a total reserve effect on a base dyeing can thereby be achieved. The dyeing process of the invention is also economical as there is no intermediary rinsing, washing or drying step between the steps (A) and (B) or (B) and (A). This is particularly advantageous for the dyeing of substrates such as carpets, enabling thereby important savings in chemicals, energy and water. Another advantage of the process of the invention is the possibility of obtaining full reserve and pure bicoloured effects with dyestuffs having particularly good fastnesses.

In accordance with one embodiment of the invention, the process comprises the sequence of steps (A), (B) and (C) in the given order. This sequence is particularly preferred when a sharp outlined pattern is desired. According to a further embodiment, the process of the invention comprises the steps (B), (A) and (C) in this order.

The following Examples further serve to illustrate the invention. In the Examples all parts are by weight and all temperatures are in degrees Centigrade unless otherwise stated.

The $K'_{pH6}$-values indicated in the following examples have been assessed in the presence of the ethoxylated cationic levelling agent of Example 1 of U.S. Pat. No. 2,967,755.

EXAMPLE 1

A tufted carpet of polyamide 66 is impregnated with a padding liquor containing, per 1000 parts 6 parts dyestuff C.I. Acid Brown 298 ($K'_{pH6}$-value=6)

8 parts commercial thickening agent based on locust bean flour 1 part commercially available non-ionic dispersing agent based on aromatic polyglycol ether 1 part sodium acetate, and 984 parts water at a pick up of 200%. The pH of this padding liquor has been adjusted to 5 by addition of acetic acid. The impregnated carpet is subsequently treated with drops of a liquor containing, per 1000 parts 15 parts commercial thickening agent which is alkali resistant 6 parts ethoxylated tallow-aminopropylamine (containing 30 ethylene-oxy units)

2 parts trisodium phosphate, and 977 parts water.

The carpet is treated afterwards for 10 minutes in saturated steam at 100° and then rinsed. A brown dyed carpet with a white pattern is obtained.

EXAMPLE 2

A tufted polyamide carpet is padded with a liquor as described in Example 1 and then treated with drops of a liquor containing, per 1000 parts 3 parts dyestuff C.I. Acid Orange 156 ($K'_{pH6}$-value=2,5)

15 parts commercial thickening agent which is alkali resistant 6 parts tallow-aminopropylamine ethoxylated with 30 mols ethylene oxide 2 parts trisodium phosphate, and 974 parts water.

The carpet is subsequently treated for 10 minutes in saturated steam at 100° and then rinsed.

A brilliant orange pattern on a brown background is obtained.

EXAMPLE 3

Knitted goods of polyamide 6 carpet yarn are impregnated at a pick-up of 100% with a padding liquor as described in Example 1 but replacing 6 parts of dyestuff C.I. Acid Brown 298 by 16 parts of dyestuff C.I. Acid Green 106. Subsequently, a printing paste containing, per 1000 parts

- 3 parts dyestuff Acid Blue 40 ($K'_{pH6}$-value=2)
- 15 parts commercial thickening agent which is alkali resistant
- 6 parts tallow-aminopropylamine ethoxylated with 30 mols ethylene oxide
- 2 parts trisodium phosphate, and
- 974 parts water is printed on the impregnated substrate by a printing screen. Then the substrate is treated for 10 minutes in saturated steam at 100°.

A print of pure blue shade is obtained with notably sharp outlines.

EXAMPLE 4

By following the procedure of example 1, 2 or 3, but replacing the ethoxylated tallowaminopropylamine by the optionally quaternized addition product of 1 mol of
(a) stearylamino-ethylamine or -propylamine
(b) behenylamino-ethylamine or -propylamine
(c) a commercially available amine mixture having the following composition:
palmityl-aminopropylamine about 30%
stearylaminopropylamine about 30%
oleylaminopropylamine about 40%
(d) N-oleylethylenediamine
(e) stearamido-propylamine
(f) tallowamido-propylamine with 1 to 100 mols ethylene oxide and/or 1 to 100 mols propylene oxide (with the proviso that the total sum of ethyleneoxy and/or propylene-oxy units present in the molecule is from 10 to 102), similar good results are obtained.

EXAMPLE 5

Knitted goods of polyamide 6 carpet yarn are impregnated with a padding liquor containing, per 1000 parts
- 12 parts dyestuff C. I. Acid Green 106 ($K'_{pH6}$-value=8,5)
- 4 parts commercial thickening agent based on locust bean flour
- 2 parts commercially available non-ionic dispersing agent, and
- 982 parts water at a pick-up of 120%.

The pH of this padding liquor has been adjusted to 6 by addition of acetic acid. The impregnated carpet is subsequently printed on selected areas with a paste containing, per 1000 parts
- 2.8 parts dyestuff C.I. Acid Yellow 151 ($K'_{pH6}$-value=3)
- 2 parts dyestuff C.I. Acid Yellow 127 ($K'_{pH6}$-value=3,5)
- 2.8 parts dyestuff C.I. Acid Orange 127 ($K'_{pH6}$-value=3,5)
- 4 parts tallow-aminopropylamine-ethoxylated with 30 mols ethylene oxide
- 15 parts commercial thickening agent which is alkali resistant
- 1 part tri-sodium phosphate
- 4 parts di-sodium hydrogeno-phosphate, and
- 968,4 parts water.

The material is subsequently treated for 10 minutes in saturated steam at 100° and then rinsed.

Yellow and orange patterns are obtained on a green background.

EXAMPLE 6

Proceeding in a manner analogous to Example 5 but replacing for the ground dyeing the 12 parts of dyestuff C.I. Acid Green 106 by a mixture of 2.2 parts of dyestuff C.I. Acid Brown 298, 0.7 parts of dyestuff C.I. Acid Green 106 and 8.24 parts of dyestuff C.I. Acid Blue 80 ($K'_{pH6}$-value=9), and for the local printing the mixture of C.I. Acid Yellow 151, C.I. Acid Yellow 127 and C.I. Acid Orange 127 by a mixture of 2 parts of dyestuff C.I. Acid Orange 156 ($K'_{pH6}$-value=2.5) and 0.4 parts of dyestuff C.I. Acid Blue 40 ($K'_{pH6}$-value=2), similar good results are obtained.

EXAMPLE 7

A nylon carpet is padded to a pick up of 60% with an aqueous liquor containing, per 1000 parts, 5 parts of a commercially available wetting agent based on an ethoxylated higher alcohol and 1 part of a commercially available thickening agent (guar gum). The resulting carpet is then printed on a flatbed printer with two pastes having the following composition per 1000 parts:

| | $K'_{pH6}$ | Paste I | Paste II |
|---|---|---|---|
| dyestuff C.I. Acid Yellow 151 | 3–3.5 | 0.075 part | 0.06 part |
| dyestuff C.I. Acid Red 217 | 4.5 | 0.05 part | 0.17 part |
| dyestuff C.I. Acid Blue 288 | 2.5 | 0.30 part | 0.02 part |
| tallow-aminopropylamine ethoxylated with 30 mols ethylene oxide | | 10 parts | 10 parts |
| commercially available wetting agent based on an ethylene-oxide/propylene oxide addition product | | 1 part | 1 part |
| commercially available thickening agent | | 8 parts | 8 parts |
| trisodium phosphate | | 1,5 parts | 1,5 parts |
| Each paste has a pH from 7.5 to 8.0 | | | |

The carpet is then locally treated on a multitak machine with a colorless paste containing, per 1000 parts:
- 10 parts of tallow-aminopropylamine ethoxylated with 30 mols ethylene oxide
- 1 part of a commercially available wetting agent based on an ethylene oxide/propylene oxide addition product
- 8 parts of a commercially available thickening agent, and
- 1.5 parts of trisodium phosphate The pH of the paste is from 7.5 to 8.0.

Subsequently, the carpet is impregnated on a Kuster machine to a pick up of 400% with a dyeing liquor having the following composition (based on 1000 parts):
- 0.025 part of dyestuff C.I. Acid Yellow 235 ($K'_{pH6}$=6)
- 1 part of dyestuff C.I. Acid Blue 296 ($K'_{pH6}$=7)
- 1 part of a commercially available thickening agent,
- 1 part of a commercially available wetting agent based on an ethoxylated higher alcohol, and
- monosodium phosphate so that the liquor has a pH from 5.5 to 6.0.

The resulting carpet is finally steamed for 6 minutes at 100° C. in a horizontal steamer.

What is claimed is:

1. In a wet-on-wet process for dyeing an anionic dyeable substrate with reserve effects, the improvement which comprises applying to at least one common area of the substrate, in one step, an acid dyeing liquor containing an anionic dye having a $K'_{pH6}$-value$\geq 5$, and in a separate step, an alkoxylated fatty amine or polyamine having affinity for anionic dyes with a $K'_{pH6}$-value$\geq 5$, there being no rinsing or drying of the substrate between said steps.

2. A process for dyeing an anionic dyeable substrate with reserve effects, which process comprises
   (A) impregnating the substrate with an acid dyeing liquor containing an anionic dye having a $K'_{pH6}$-value$\geq 5$
   (B) applying locally to the substrate at room temperature, a liquor or paste containing an alkoxylated fatty amine or polyamine having affinity for anionic dyes with a $K'_{pH6}$-value$\geq 5$, said step (B) being carried out directly after or directly before said step (A), and the dyeing liquor of step (A) and the liquor or paste of step (B) being applied to at least one common area of the substrate, and
   (C) subsequently submitting the substrate to a heat treatment to effect fixation of the dye.

3. A process according to claim 2 wherein step (A) is a ground dyeing or printing of the whole area of the substrate.

4. A process according to claim 2 wherein the dyeing liquor used in step (A) has a pH from 4 to 7.

5. A process according to claim 2 wherein the anionic dye applied in step (A) has a $K'_{pH6}$-value$\geq 6$.

6. A process according to claim 2 wherein the anionic dye of step (A) is an acid dye bearing at least two sulpho groups or a metal complex dye containing at least one sulpho group.

7. A process according to claim 6 wherein the steps are carried out in the order (B), (A), (C).

8. A process according to claim 2 wherein step (A) is carried out at room temperature.

9. A process according to claim 2 wherein the liquor or paste applied in step (B) contains an alkoxylated fatty amine or polyamine of formula I

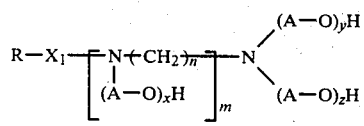

wherein
R is $(C_{10-24})$alkyl or $(C_{10-24})$alkenyl
$X_1$ is —CO— or a direct bond
in each $(A—O)_x$, $(A—O)_y$ and $(A—O)_z$ chain A is, independently, —CH$_2$CH$_2$— or

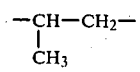

each n is, independently, 2 or 3
m is O or an integer from 1 to 6, and
each x, y or z is a numeral from 1 to 100 the sum x+y+z being from 10 to 102,
in the form of a free base, acid addition salt quaternary ammonium salt or mixture thereof, or mixtures of such compounds differing from one another by virtue of the significance of R.

10. A process according to claim 9 wherein the liquor or paste applied in step (B) contains an alkoxylated fatty amine or polyamine of formula Ia

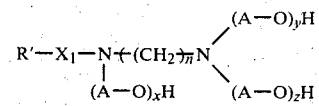

wherein
$A$, $X_1$, $x$, $y$, $z$ and $n$ are as stated in claim 9, and
$R'$ is $(C_{12-24})$alkyl or $(C_{12-24})$alkenyl.

11. A process according to claim 9 wherein, in the compound of formula I
R is $(C_{12-24})$alkyl or $(C_{12-24})$alkenyl,
n is 3 when m is 1 and is 2 when m exceeds 1 and
the sum of x+y+z is 15 to 80.

12. A process according to claim 9 wherein the compound of formula I is the product of the addition of 15 to 80 mols of ethylene oxide to aminopropyl-tallow amine or to tallow fatty acid amidopropylamine.

13. A process according to claim 9 wherein the steps are carried out in the order (B), (A), (C).

14. A process according to claim 9 wherein the substrate is natural or synthetic polyamide or a blend thereof and step (A) is a ground dyeing or printing of the whole area of the substrate using a dye liquor having a pH of 4 to 7 and the liquor or paste applied in step (B) has a pH from 5 to 10 which is at least one unit higher than the pH of the liquor used in step (A), said steps (A) and (B) being carried out without any intermediary rinsing or drying step.

15. A process according to claim 14 wherein the steps are carried out in the order (B), (A), (C).

16. A process according to claim 14 wherein the anionic dye applied in step (A) has a $K'_{pH6}$-value$\geq 6$ and is an acid dye bearing at least two sulpho groups or a metal complex dye containing at least one sulpho group and, in the compound of formula I, R is $(C_{12-24})$alkyl or $(C_{12-24})$alkenyl, n is 3 when m is 1 and is 2 when m exceeds 1, and the sum of x+y+z is 15 to 80.

17. A process according to claim 16 wherein the steps are carried out in the order (B), (A), (C).

18. A process according to claim 14 wherein the liquor or paste applied in step (B) contains in addition to the alkoxylated fatty amine or polyamine, a disperse or anionic dye or a mixture thereof or an anionic optical brightening agent, said anionic dye or anionic optical brightening agent having a $K'_{pH6}$-value$\leq 5$ and at least one unit lower than the $K'_{pH6}$-value of the anionic dye used in step (A), and said dye(s) or optical brightening agent applied in step (B) being also fixed by the heat treatment of step (C).

19. A process according to claim 18 wherein the anionic dye applied in step (A) has a $K'_{pH6}$-value$\geq 6$ and is an acid dye bearing at least two sulpho groups or a metal complex dye containing at least one sulpho group and the liquor or paste applied in step (B) contains an anionic dye selected from the group consisting of non-metalized acid and direct dyes containing a maximum of one sulpho group and metal complex dyes free from sulpho groups, and, in the compound of formula I, R is $(C_{12-24})$alkyl or $(C_{12-24})$alkenyl, n is 3 when m is 1 and is 2 when m exceeds 1, and the sum of x+y+z is 15 to 80.

20. A process according to claim 19 wherein the steps are carried out in the order (B), (A), (C).

21. A process according to claim 2, wherein the liquor or paste applied in step (B) contains 1 to 15 g/liter of alkoxylated fatty amine or polyamine.

22. A process according to claim 2 wherein the liquor or paste applied in step (B) has a pH from 5 to 10, said pH being at least 1 unit higher than the pH of the liquor used in step (A).

23. A process according to claim 2 wherein the liquor or paste applied in step (B) contains, in addition to the alkoxylated fatty amine or polyamine, a disperse or anionic dye or a mixture thereof or an anionic optical brightening agent, said anionic dye or anionic optical brightening agent having a $K'_{pH6}$-value $\leq 5$ and at least one unit lower than the $K'_{pH6}$-value of the anionic dye used in step (A), and said dye(s) or optical brightening agent applied in step (B) being also fixed by the heat treatment of step (C).

24. A process according to claim 23 wherein the liquor or paste applied in step (B) contains, in addition to the alkoxylated fatty amine or polyamine, an acid dye having a $K'_{pH6}$-value 2 to 6 units lower than the $K'_{pH6}$-value of the anionic dye applied in step (A).

25. A process according to claim 23 wherein any anionic dye applied in step (B) is selected from the group consisting of non-metalized acid and direct dyes containing a maximum of one sulpho group and metal complex dyes free from sulpho groups.

26. A process according to claim 23 wherein the steps are carried out in the order (B), (A), (C).

27. A process according to claim 2, wherein the substrate dyeable with anionic dyes comprises natural or synthetic polyamide or blends thereof.

28. A process according to claim 2, comprising
  (B) applying locally to the substrate at room temperature a liquor or paste containing an alkoxylated fatty amine or polyamine having affinity for anionic dyes with a $K'_{pH6}$-value $\geq 5$,
  (A) directly thereafter impregnating the locally treated substrate with an acid dyeing liquor containing an anionic dye having a $K'_{pH6}$-value $\geq 5$, and
  (C) subsequently submitting the substrate to a heat treatment to effect fixation of the dye.

29. A process according to claim 2 wherein the amine or polyamine applied in step (B) is cationic or amphoteric and is free from fiber-reactive groups.

30. A process according to claim 2 wherein the liquor of step (A) and the liquor or paste of step (B) are free from reducing agents.

* * * * *